United States Patent
Wang et al.

(10) Patent No.: US 6,459,507 B1
(45) Date of Patent: Oct. 1, 2002

(54) IMAGE SCANNER WITH A STEPPING CONTROL TABLE

(75) Inventors: Jin-Dar Wang, Taichung (TW); Liang-Yi Li, Hsinchu (TW); Murphy Chiu, Taichung (TW); Andy Hu, Hsinchu (TW)

(73) Assignee: Microtek International Inc., Hsinchu (TW)

( * ) Notice: Subject to any disclaimer, the term of this patent is extended or adjusted under 35 U.S.C. 154(b) by 0 days.

(21) Appl. No.: 09/303,304

(22) Filed: Apr. 30, 1999

(51) Int. Cl.[7] .............................. H04N 1/04; H02P 8/00; G05B 19/40
(52) U.S. Cl. ..................... 358/474; 358/474; 318/696; 318/685
(58) Field of Search ................................ 358/486, 497, 358/474, 494, 412, 406, 505, 506, 487, 482, 409; 318/696, 685

(56) References Cited

U.S. PATENT DOCUMENTS 4,779,121 A * 10/1988 Okumura ..................... 355/68
5,963,006 A * 10/1999 Otani ........................ 318/696
6,115,149 A * 9/2000 Lai et al. .................... 358/505

* cited by examiner

Primary Examiner—Cheukfan Lee
(74) Attorney, Agent, or Firm—Darby & Darby

(57) ABSTRACT

This invention provides a scanner, which is capable of scanning document images based on a stepping control table and a method to generate such a table. This scanner includes a scanning module to scan a document and generates a responding image signal, a stepping motor to drive the scanning module or the document and a control device to control the operation of the scanning module and the stepping motor. This control device includes a stepping control table, which contains the stepping numbers for the stepping motor to drive the scanning module or the document. While scanning a document, this device will accurately control the stepping motor according to the stepping numbers relating to the locations of the lines to be scanned, and further move the scanning module or the document to a pre-defined position for a scanning task. A design like this will reduce errors in a scanning module's movement caused by the mechanical deviation.

10 Claims, 5 Drawing Sheets

IMAGE SCANNER WITH A STEPPING CONTROL TABLE

BACKGROUND OF THE INVENTION

This invention provides an image scanner, which can accurately drive the scanning module or documents based on a stepping control table as well as the method to generate such a table.

Due to the fact that image scanners have been widely adopted in many fields, the resolutions of these scanners are rising continuously under the requirement to promote the quality. For a flatbed scanner, its scanning module is placed at carriage and driven by a driving device which comprising a stepping motor and some guiding mechanics. In order to raise the scanning resolution, the accuracy of the driving device must be raised in the meantime to meet such a high accuracy requirement. However, there are always some tolerance in driving device during manufacture and assembly. The accumulated tolerance will definitely produce some periodic deviations, which make the scanning module fail to be brought to the proper positions accordingly Reference to FIG. 1. It is a curve to show the deviations generated by a scanning module of an image scanner during scanning. The horizontal axis (x-axis) represents the pre-defined positions of scanning line and the vertical axis (y-axis) represents the deviation distance for each predefined scanning line. The distances between each scanning line are depending on the resolution of a scanner, for example, 1/300 inch for 300 DPI resolution, and is driven by stepping motor with fix steps, for example 8 steps. From the curve 34 in FIG. 1, it can be found that the mechanical tolerance in driving device will produce a periodic deviation during a serial scanning procedure.

This periodic error will cause some variations. For instance, it will make a straight line looks not smooth on image after scanning. Therefore, the main purpose of this invention is to provide a method to move the scanning module accurately based upon a stepping control table in order to solve the problems caused by the periodic deviation.

DETAILED DESCRIPTION OF THE INVENTION

Figure 1:
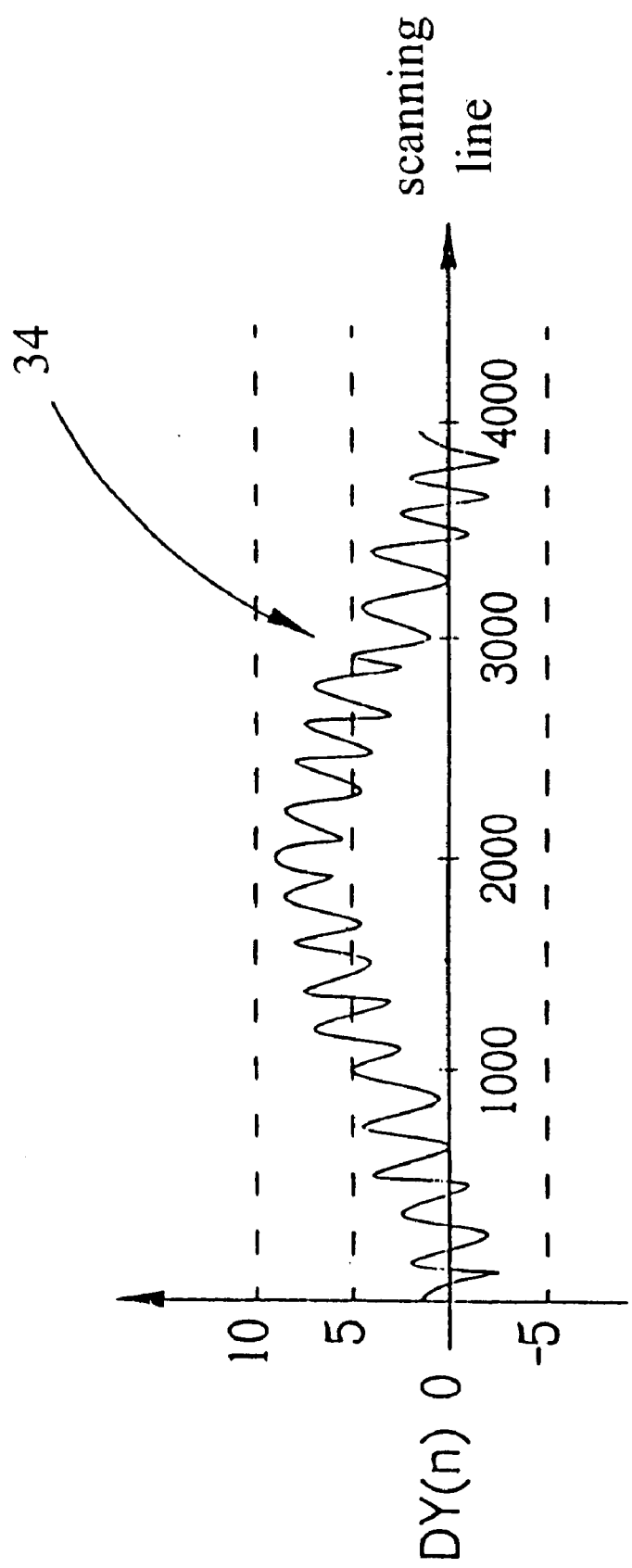
FIG. 1 is the curve to show the deviation generated by driving device during the scanning.
Figure 2:
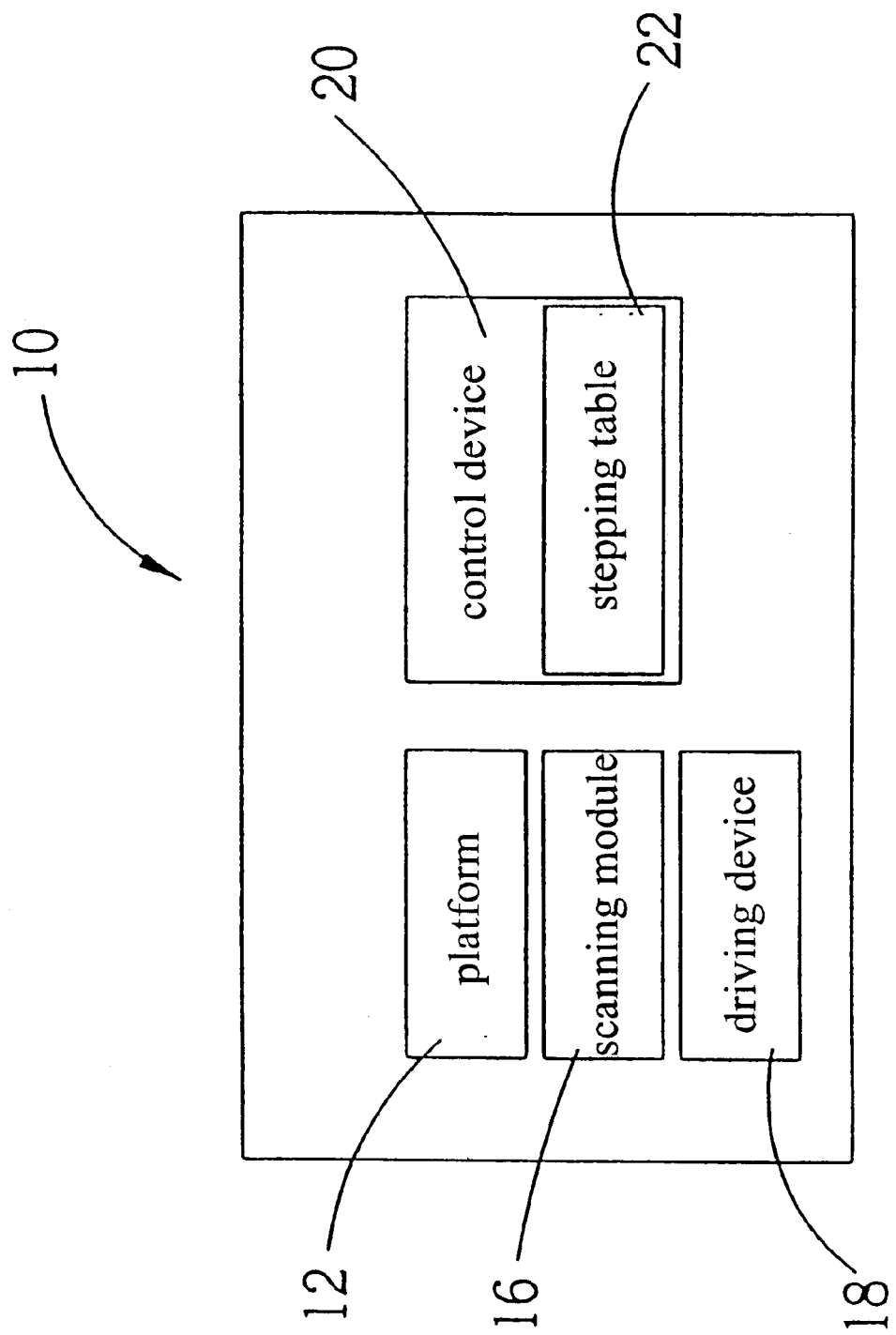
FIG. 2 represents the functional blocks for this invention.

Reference to FIG. 2. It's the functional block for a scanner 10 with the features introduced by this invention. The scanner 10 can be a flatbed scanner or a film scanner. The scanner 10 comprises a scanning platform 12 for placing document, a scanning module 16 to scan document, a driving device 18 to drive the scanning module 16 moving along a certain direction, and a control device 20 to control the operations of the driving device 18 and the scanning module 16. Plus, each scanning line is perpendicular to the moving direction 26 of scanning module 16. The driving device 18 comprises a stepping motor.

This invention also provides a method to generate the stepping control table 22. The stepping control table 22 contains the stepping number S(n) for each scanning line. "n" represents the nth scanning line. The control device 20 will control the stepping motor in driving device 18 based upon the stepping numbers stored in the stepping control table 22 to move the scanning module 16 accurately.

The following sections will describe the procedures to generate the stepping control table 22 with this invention.

1. Scanning a Calibrating Document

Figure 3:
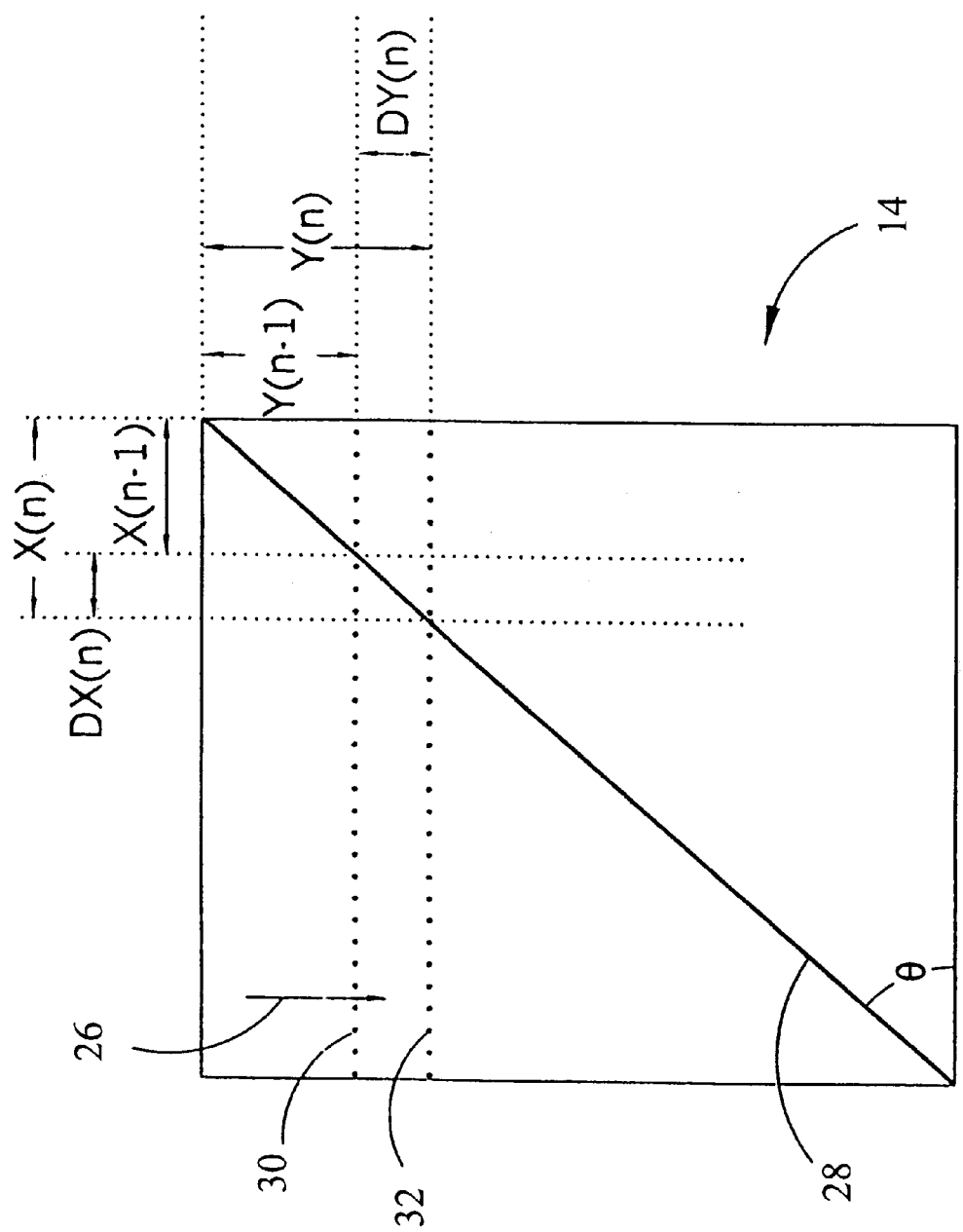
FIG. 3 represents a calibrating document having calibrating patterns.

Reference to FIG. 3. FIG. 3 is a calibrating document 14 with a calibrating pattern. The length of this calibrating document must be able to at least cover the length of the scanning platform 12, i.e. the total traveling distance for the scanning module 16. Arrow 26 points to the moving direction of the scanning module 16 while scanning. The calibrating pattern also contains at least one oblique line 28 (a plurality of parallel oblique lines will be better). The oblique line 28 is parallel to neither the scanning lines nor the moving direction of the scanning module 16. Let the angle between a oblique line 28 and scanning lines be θ and the scanning module 16 will be moved line-by-line by the stepping motor with predefined stepping number A. Control device 20 keeps moving the scanning module 16 to scan whole calibrating document.

2. Calculate the Actual Moving Distance of Each Scanning Line

The actual position of each scanning line can be obtained based upon the shift of the image of the oblique lines 28 from one scanning line image to another scanning line image. For example, the scanning module 16 scans the calibrating document 14 and generates the first image signals 30 at first scanning line and the nth image signals 32 at nth scanning line. Next, find the position X(l) and X(n) of the oblique lines 28 within both image signals 30, 32 respectively. Then calculate the shift value and the actual moving distance between these two scanning line.

3. Determine the Stepping Number for Each Scanning Line

The actual moving distance for each scanning line can be obtained with the procedures described above. Then, the proper stepping numbers for each scanning line can be calculated by comparing the actual moving distance and predefined moving distance and saved in the stepping control table 22. Therefore, the driving device 18 can move the scanning module 16 to nearly predefined position according to the stepping number stored in the location table.

Figure 4:
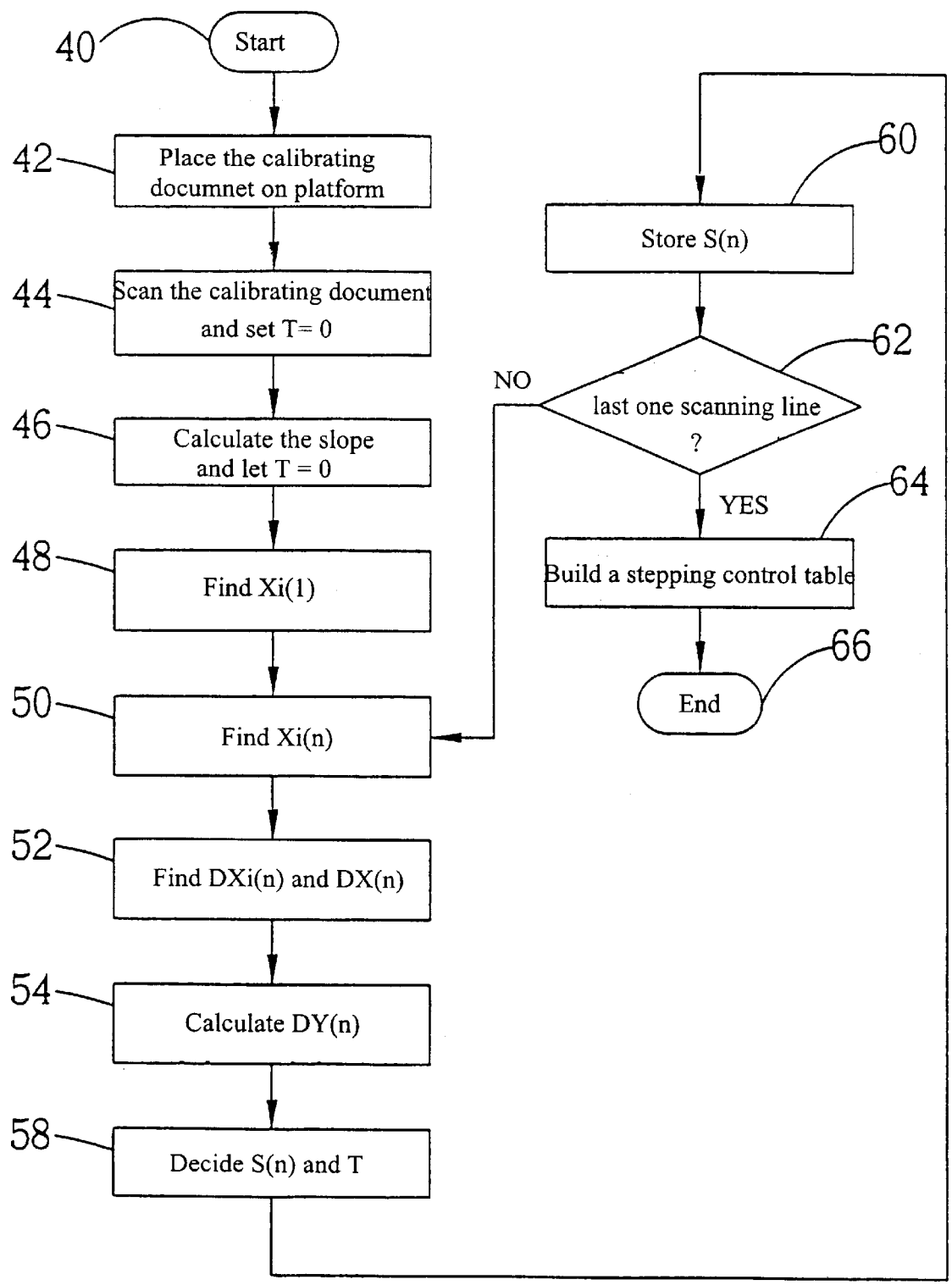
FIG. 4 shows the flow chart to generate a stepping control table.

Reference to FIG. 4. FIG.4 is the flow chart to show how the stepping control table is generated.

Step 40: Start.

Step 42: Place the calibrating document on the scanning platform.

Step 44: Scan the whole calibrating document based upon the pre-defined stepping number A to generate each scanning line image.

Step 46: Calculate the slope of the oblique line and set the accumulated calibrating value T=0.

Step 48: Obtain the position Xi(1) of each oblique line for a first scanning line image. The position Xi of each oblique line can be the edge of the oblique line.

Step 50: Obtain the position Xi(n) of each oblique line for a nth scanning line image, where n is from 2 to last scanning line.

Step 52: Calculate the each deviation DXi(n) in the horizontal direction for each scanning line image and the mean value DX(n) from total DXi(n).

Step 54: Find the deviation between the actual position and the predefined position of each scanning line.

i.e. $DY(n)=DX(n)*\tan(\theta)$.

Step 58: Determine the stepping number S(n) and add the calibrating step into T.

Step 60: Store S(n) into the stepping control table 22.

Step 62: If it's the last line to scan? If so, move to Step 64, otherwise, jump to Step 50.

Step 64: Build the stepping control table with S(i), (i=1 ... n).

Step 66: The End.

The description mentioned below explains how to find the position Xi of each oblique line for each scanning line image. Assume that the output of each sensor pixel 17 of scanning module has 8 bits with 256 gray level and a number between the maximum and the minimum values (0~255) like 128 is selected as the reference number R. If a edge of the oblique line at one scanning line image is between S1 and S2 sensor pixel and the output of the S1 and S2 is V1 and V2 respectively, the position X(n) of sensing pixel for this edge can be determined by the following linear equation:

$$X(n)=P1+(R-V1)/(V2-V1) \quad (1)$$

If a document contains a set of parallel oblique lines with same slope, we can find a plurality of edge positions, Xi(n), i=1, 2, 3, ..., m. So, the shift value between two scanning line image is Xi(n)−Xi(1), and the deviation can be obtained with equation (2) below:

$$DXi(n)=Xi(n)-Xi(1)+(n-1)+T/A \quad (2)$$

wherein

DXi(n): the deviation for the ith edge for the another scanning line

Xi(n): the position of the ith edge t for the another scanning line image

Xi(1): the position of the ith edge for the first scanning line image

A: pre-defined stepping number

T: accumulated calibrating stepping number

N: scanning line number from 2 to last one

So, the average deviation for all edge (i=1~m) can be calculated from equation (3).

$$DX(n) = \frac{1}{m}\sum_{i=1}^{m} DXi(n) \quad (3)$$

Also, according to the trigonometry, the deviation DY(n) can be calculated from equation (4).

$$DY(n)=DX(n)*\tan(\theta) \quad (4)$$

Next, how to decide the stepping number S(n) for each scanning line with DY(n) cab be shown as below.

(1) If DY(n)>1/(2A), S(n)=A−1 & T=T−1; or (2) If DY(n)<−1/(2A), S(n)=A+1 & T=T+1; or (3) Otherwise S(n)=A & T remains unchanged.

When the stepping control table is created, the control device 20 will control the driving device 18 according to this table and the scanning module 16 can be moved to pre-defined position for each scanning line.

Figure 5:
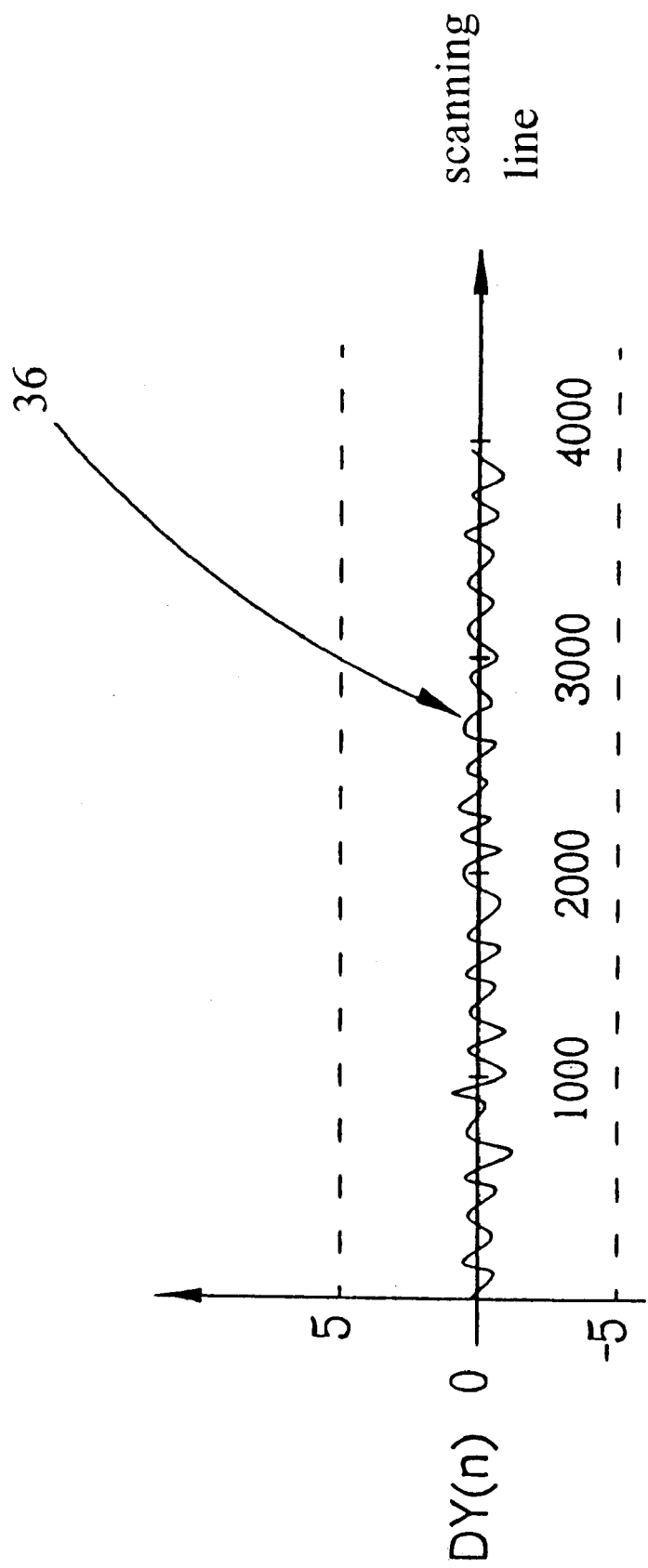
FIG. 5 is the curve to show the deviations for an image scanner.

Reference FIG. 5. It is the deviation curve of an image scanner after calibration. The horizontal axis represents the scanning line number and the vertical axis represents the deviation. The deviation curve 36 after calibrating differs hugely with the curve 34 before calibrating. The deviations in curve 36 are much smaller than those in curve 34. Therefore, this method with the stepping control table can really reduce deviations and increase the accuracy for the transmission.

The scanner with this invention can also be a penetrating type including a transparent platform for setting a transparency. In another word, this invention can be suitably applied to both flatbed and film scanners.

While the exemplary preferred embodiments of the present invention are described herein with particularity, those having normal skill in the art will recognize various changes, modifications, and application other than those specifically mentioned herein without departing from the spirit of this invention.

What is claimed is:

1. A method for generating a stepping control table of an image scanner, the scanner comprising a line scanning module, a driving device, and a control device, the stepping control table comprising a plurality of stepping number wherein the control device uses the stepping control table to control the driving device, the method comprising the steps of:

providing a calibrating document having a calibrating pattern;

driving an object selected from the group of the scanning module and the calibrating document along a scanning direction;

scanning the calibrating document;

generating a plurality of line image signals, each line image signal representing an image of the calibrating pattern;

recording a step position of the scanning module when generating a line image signal;

calculating an actual scanning position of the line image signal according to a variation between the image of the calibrating pattern of the line image signal and an image of the calibrating pattern of another line image signal; and generating the stepping control table according to the recorded step position and the actual scanning position of the line image signal.

2. The method of claim 1 wherein each image represented by the line image signals is scanned by the scanning module along a direction substantially perpendicular to the scanning direction.

3. The method of claim 2 wherein the calibrating pattern comprises at least one oblique line non-parallel to the scanning direction and a direction of the line image signal, the line image signals contains the image of the oblique line, and the actual scanning position of the line image signal is calculated according to a position change between the image of the oblique line and another line image signal.

4. The method of claim 3 wherein the distance between an actual scanning position of a first line image signal and an actual scanning position of a second line image signal is derived from the distance between the image positions of the oblique line and the slope of the oblique line, and the actual scanning position of the first line image signal is obtained from that of the second line image signal and the distance between the actual scanning positions of the first and second line image signals.

5. The method of claim 4 wherein the second and the first line image signals are sequentially generated by the scanning module when scanning the calibrating document along the scanning direction.

6. The method of claim 1 wherein the scanner comprises a transparent platform for placing a document to be scanned, and the driving device is used for driving the scanning module in a step-by-step fashion along the scanning direction to scan the document placed on the transparent platform.

7. The method of claim 1 wherein the scanner comprises a platform for fixing a document to be scanned, and the driving device is used for driving the platform step-by-step along the scanning direction so that the scanning module can scan the document fixed on the platform.

8. An image scanner comprising:
   a line scanning module for scanning a line image of a document to generate a line image signal;
   a driving device for driving an object selected from the scanning module and the document in a step-by-step fashion along a scanning direction to scan the document; and
   a control device for controlling operations of the scanning module and the driving device, the control device comprising a stepping control table having a plurality of stepping numbers, said stepping control table being generated by a) providing a calibrating document having a calibrating pattern, b) driving the object along a scanning direction, c) scanning the calibrating document, d) generating a plurality of line image signals, each line image signal representing an image of the calibrating pattern, e) recording a step position of the scanning module when generating a line image signal, and f) calculating an actual scanning position of the line image signal according to a variation between the image of the calibrating pattern of the line image signal and an image of the calibrating pattern of another line image signal;
   wherein the control device uses the stepping control table to control the driving device so that the line image of the document at a step positions of the stepping control table is scanned.

9. The method of claim 8 wherein the scanner comprises a transparent platform for placing a document to be scanned, and the driving device is used for driving the scanning module in step-by-step fashion along the scanning direction to scan the document placed on the transparent platform.

10. The method of claim 8 wherein the scanner comprises a platform for fixing a document to be scanned, and the driving device is used for driving the platform in step-by-step fashion along the scanning direction so that the scanning module can scan the document fixed on the platform.

* * * * *